United States Patent [19]

Hoffman

[11] Patent Number: 4,460,208
[45] Date of Patent: Jul. 17, 1984

[54] VACUUM GRIPPING APPARATUS
[75] Inventor: Barry L. Hoffman, Stevens, Pa.
[73] Assignee: RCA Corporation, New York, N.Y.
[21] Appl. No.: 371,478
[22] Filed: Apr. 23, 1982
[51] Int. Cl.³ .............................................. B66C 1/02
[52] U.S. Cl. ...................................................... 294/65
[58] Field of Search .................... 294/65, 64 R, 64 A, 294/64 B, 103; 414/627, 723; 254/390; 271/9, 91, 107

[56] References Cited

U.S. PATENT DOCUMENTS

| | | | |
|---|---|---|---|
| 2,890,077 | 6/1959 | Littell | 294/65 |
| 3,165,899 | 1/1965 | Shatto, Jr. | 61/69 |
| 3,361,280 | 1/1968 | Traver | 214/650 |
| 3,418,099 | 12/1968 | Carter et al. | 65/284 |
| 3,861,732 | 1/1975 | Piper | 294/65 |
| 3,982,782 | 9/1976 | Bos | 294/64 |
| 4,129,328 | 12/1978 | Littell | 294/65 |
| 4,200,420 | 4/1980 | Cathers et al. | 414/107 |
| 4,228,993 | 10/1980 | Cathers | 271/236 |

FOREIGN PATENT DOCUMENTS

| | | | |
|---|---|---|---|
| 1299261 | 10/1965 | Fed. Rep. of Germany | 294/65 |
| 2845338 | 3/1979 | Fed. Rep. of Germany | 294/65 |

*Primary Examiner*—James B. Marbert
*Attorney, Agent, or Firm*—Eugene M. Whitacre; Dennis H. Irlbeck; Lester L. Hallacher

[57] ABSTRACT

A vacuum gripper for holding objects having curved surfaces includes a plurality of hollow arms extending outwardly from a flex axis. The arms are individually flexible with respect to the flex axis and normally lie in the same plane. Each arm supports a vacuum cup at the free end thereof. The arms individually flex when the cups contact a curved surface so that all cups grasp the object firmly irrespective of the configuration of the curved surface.

5 Claims, 2 Drawing Figures

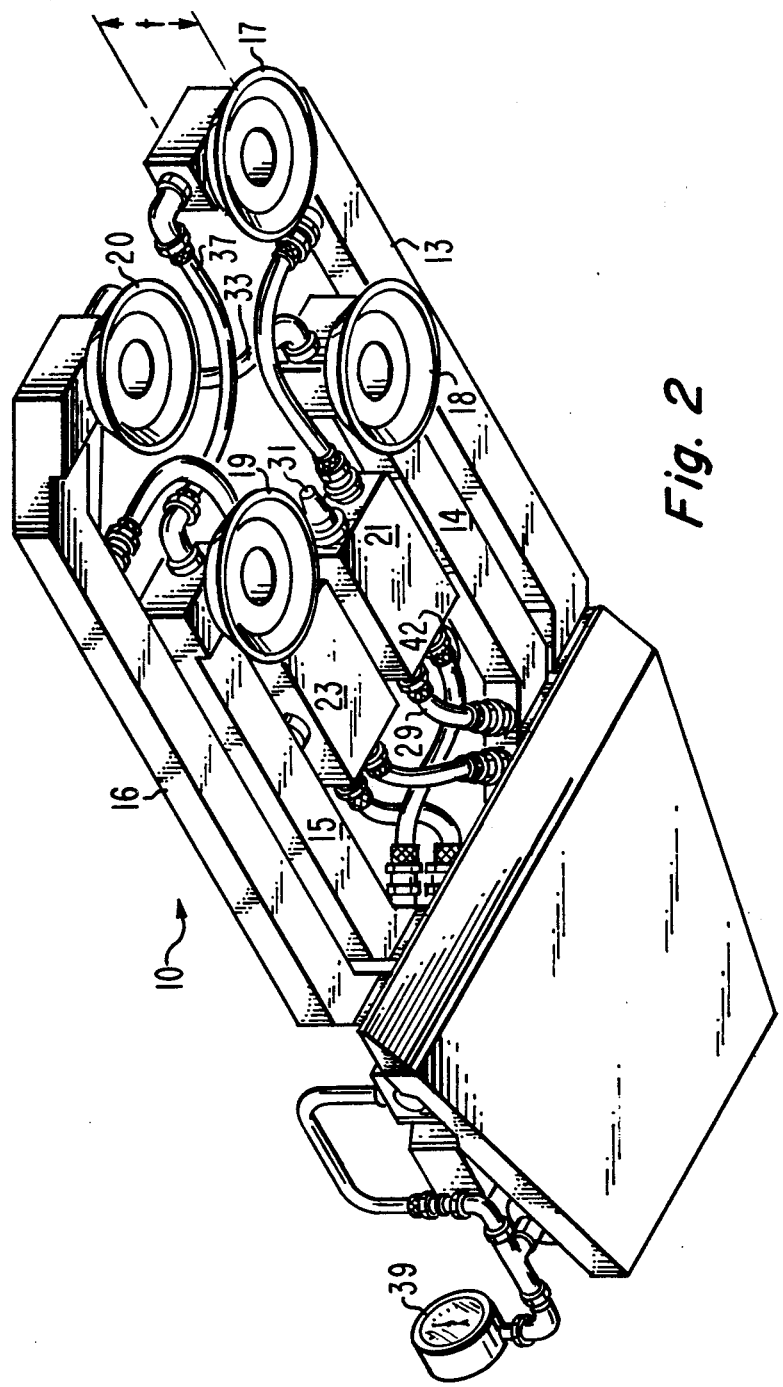

VACUUM GRIPPING APPARATUS

BACKGROUND OF THE INVENTION

This invention relates generally to lifting mechanisms and particularly to a vacuum gripping apparatus for lifting objects having curved surfaces.

During the production of various articles utilizing automated equipment it is frequently necessary to move curved articles from one location to another. In such production, an automatic gripping device which can firmly grasp the curved surface of the article is needed. An example of such production is the manufacture of picture tubes for television receivers. As the tubes move along the various assembly lines, it frequently is necessary to grasp the curved surface of the viewing screen to transfer a tube from one processing line to another. The tubes typically are moving along an assembly line and can not be precisely positioned before being picked up. It, therefore, is necessary for the gripping mechanism to be able to firmly grasp the picture tube anywhere on the curved surface of the viewing screen. Additionally, the configuration of the curve can vary for different sizes of objects and for the many different positions on the surface at which the gripping mechanism can contact the screen. The successful gripping mechanism, therefore, must be capable of conforming to the configuration of the object to be lifted. Additionally, the successful gripping mechanism must be highly reliable so that expensive objects are not inadvertently dropped. Another requirement of the successful gripping mechanism is that of a small dimensional thickness so that the gripping mechanism is capable of grasping and firmly holding the television tubes in crowded areas.

The instant invention fulfills these requirements by the provision of a vacuum actuated gripping mechanism which readily conforms to the configuration of curved objects, which is provided with more than one gripping mechanism, and which is thin with respect to the other dimensions of the gripping mechanism.

SUMMARY OF THE INVENTION

A vacuum gripping apparatus for lifting objects having curved surfaces includes a flex axis and a plurality of arms arranged to individually flex with respect to the axis. Holding members are individually supported at the free ends of the arms whereby the arms flex and individually bring the holding members into contact with the curved surface and the holding members firmly grasp the surface.

BRIEF DESCRIPTION OF THE DRAWINGS

FIG. 2 is a perspective view of the bottom side of the preferred embodiment of FIG. 1.

DETAILED DESCRIPTION OF THE PREFERRED EMBODIMENT

Figure 1:
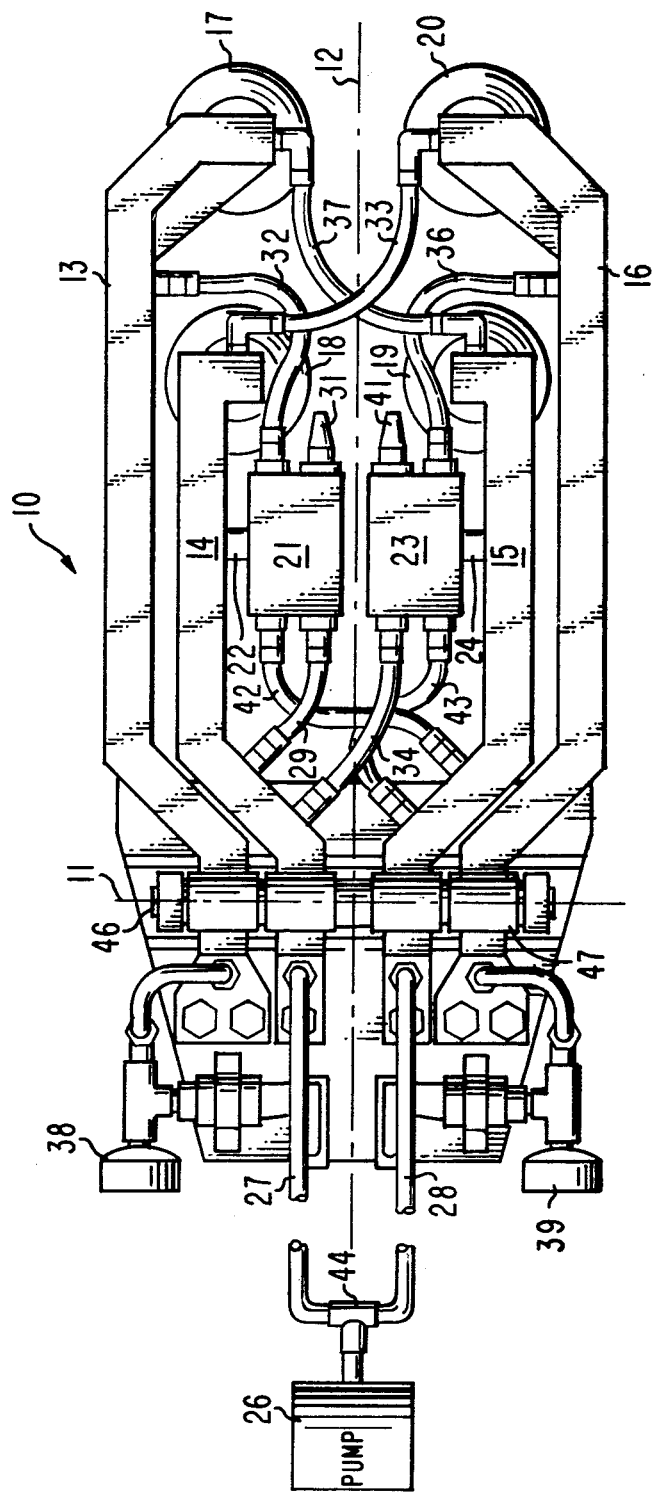
FIG. 1 is a top view of a preferred embodiment.

In FIG. 1, a vacuum gripping, or holding, apparatus 10 includes a flex axis 11 which is arranged perpendicular to the centered longitudinal axis 12 of the gripping apparatus 10. Four hollow arms 13, 14, 15 and 16 are arranged so that a major portion of each of the four arms is substantially perpendicular to the flex axis 11, and substantially parallel to the longitudinal axis 12. All the arms 13 to 16 lie in the same plane which is substantially parallel to the flex axis 11. Vacuum cups 17, 18, 19 and 20 are supported at the free ends of the arms 13, 14, 15 and 16, respectively. The cups are coupled to the arms by hollow fillings. Accordingly, when air is evacuated from the arms, the air is also evacuated from the space between the cups and the objects being held. The arms 13 through 16 have a square cross section in order to more easily insert threaded couplings into the arms.

The arms 13 through 16 are arranged to flex with respect to the flex axis 11, but are not free to pivot laterally with respect to such axis. Accordingly, in the normal or relaxed position, the arms 13 through 16 all lie in the same plane. However, because of the flexibility of the arms, when a curved object, such as the screen of a television tube, is contacted by the vacuum cups 17 through 20, the arms individually flex and all of the vacuum cups uniformly contact the surface of the screen. For this reason, all four of the cups 17 through 20 uniformly engage the surface of the screen and a positive seal is formed between all the cups and the curved surface of the screen irrespective of the exact location of contact and irrespective of the configuration of the curve.

Each of the arms 13, 14, 15 and 16 includes a hollow bushing 47 which is centered about a pin 46. The pin 46 is centered about the flex axis 11. The bushings 47 are integral with the arms and are sealed about the pin 46. Because the bushings 47 are hollow, air flows around the pin and through the hollow arms. When the cups 17, 18, 19 and 20 are displayed by contacting a curved surface the bushings can rotate slightly with respect to the pin 46 so that the arms flex with respect to the flex axis 11. When the cups no longer contact the curved surface the arms return to their natural unflexed positions.

A first vacuum generator 21 is coupled to the arm 14 by a threaded coupling 22. Similarly, a second vacuum generator 23 is coupled to the arm 15 by a threaded coupling 24. A pneumatic pump 26, which operates at approximately 50 psi, for example, is coupled by a diverter 44 to two pneumatic lines 27 and 28 which respectively are connected into the arms 14 and 15. Pneumatic lines 29 and 34 connect the arm 14 to the vacuum generators 21 and 23, respectively. Pneumatic lines 42 and 43 couple the arm 15 to the vacuum generators 21 and 23, respectively. Another pneumatic line 32 connects the vacuum generator 21 to the arm 13. The arms 14 and 16 are connected into a pair by a pneumatic line 33 and the arms 15 and 13 are connected into a pair by a pneumatic line 37.

In operation, the pump 26 provides pressurized air to the vacuum generators 21 and 23, via the line 27 and the lines 29 and 34, respectively. The pressurized air passes through the vacuum generators and exhaust fittings 31 and 41 of the generators 21 and 23, respectively. The passage of air through the vacuum generators 21 and 23 pulls air from the hollow arms 13, 14, 15 and 16 through the fittings 22 and 24 and all four arms are simultaneously evacuated. Vacuum gauges 38 and 39 are respectively coupled to the arms 13 and 16 so that the vacuum present in the pairs of arms can be read at any instance. The arms 14 and 16 are connected by the line 33 and thus these two arms operate as a pair. Similarly the arms 13 and 15 are coupled by the pneumatic line 37 and operate as another pair. Accordingly, the failure of a line or vacuum cup in either pair has no adverse effect on the vacuum in the other pair and the object is still firmly held. When the object being held is to be released, the direction of air from the pump 26 is diverted by the diverter 44 and input to the vacuum generators 21 and 23 via the line 28, the arm 15 and the lines 42 and 43, respectively. Air passes from the vacuum generators 21 and 23 to the arms 13 and 16 via lines 32 and 36, respectively, and the vacuums in the four cups 17 through 20 are broken to release the object.

The arms 13 through 16 are dimensioned so that vacuum cups 17 thorugh 20 are arranged in the corners of a square which is centered with respect to the longitudinal axis 12 of the gripping apparatus 10. Accordingly, in the event of failure of the vacuum in one of the pairs of vacuum cups, two cups which are disposed on opposite sides of the axis 12 continue to firmly grasp the object and the object does not have a tendency to rotate about the axis 12 and break loose from the remaining two cups.

As shown in FIG. 2, the thickness "t" from the bottom of the vacuum cup 20 to the top of the arm 10 is small compared to the overall length and width of the mechanism and in the preferred embodiment is the order of approximately 4 inches (10 centimeters). This allows the gripping device to be used on assembly lines where space is limited.

What is claimed is:

1. A vacuum gripping apparatus for lifting objects having curved surfaces comprising:
   a flex axis;
   a plurality of arms extending from one side of said flex axis in substantially the same plane, said plane being substantially parallel to said flex axis, a major portion of each of said arms being substantially perpendicular to said flex axis;
   a plurality of vacuum holding members individually supported at the free ends of said arms whereby said arms individually flex out of said plane and individually bring said holding members into contact with said curved surface and said holding members grasp said surface for all curvatures of said surface.

2. The gripping apparatus of claim 1 wherein said holding members are vacuum cups and said arms are hollow, and further including means for evacuating air from said arms and said cups whereby said cups grasp said surface by suction.

3. The gripping apparatus of claim 2 wherein there are four of said arms, and said arms are dimensioned so that said cups lie in a substantially square pattern.

4. The gripping apparatus of claim 2 or 3 further including means for pneumatically connecting alternate arms whereby said vacuum cups cooperate in individually evacuated pairs.

5. The gripping apparatus of claim 4 wherein the vacuum cups in each pair lie on opposite sides of the longitudinal axis of said gripping apparatus.

* * * * *